United States Patent [19]

Kushibiki et al.

[11] Patent Number: 5,596,060

[45] Date of Patent: Jan. 21, 1997

[54] CURABLE POLYTITANOSILOXANE COMPOSITIONS AND METHOD FOR PREPARING CURED POLYTITANOSILOXANES USING SAID COMPOSITIONS

[75] Inventors: Nobuo Kushibiki; Yoko Sugata, both of Kanagawa, Japan; Toshio Suzuki, Midland, Mich.

[73] Assignee: Dow Corning Asia, Ltd., Tokyo, Japan

[21] Appl. No.: 414,603

[22] Filed: Mar. 31, 1995

[30] Foreign Application Priority Data

Apr. 1, 1994 [JP] Japan .................................. 6-065170

[51] Int. Cl.$^6$ .................................................. C08G 77/08
[52] U.S. Cl. ............................................. 528/15; 528/24
[58] Field of Search ........................................ 528/15, 24

[56] References Cited

U.S. PATENT DOCUMENTS 4,451,634  5/1984  Hatanaka et al. ........................ 528/24
5,110,863  5/1992  Sugama ................................... 528/41

*Primary Examiner*—Melvyn I. Marquis
*Attorney, Agent, or Firm*—Robert Spector

[57] ABSTRACT

This invention provides curable compositions comprising a polytitanosiloxane containing at least two alkenyl radicals per molecule and a crosslinking agent that is either 1) the combination of an organohydrogensiloxane containing at least two silicon-bonded hydrogen atoms per molecule and a platinum-containing catalyst or 2) an organic peroxide. This invention also provides a method for curing a polytitanosiloxane by reacting it with the crosslinking agent of the present compositions.

6 Claims, No Drawings

CURABLE POLYTITANOSILOXANE COMPOSITIONS AND METHOD FOR PREPARING CURED POLYTITANOSILOXANES USING SAID COMPOSITIONS

BACKGROUND OF THE INVENTION

1. Field of the Invention

The present invention relates to curable polytitanosiloxane compositions. More particularly, this invention relates to these curable compositions and a method for curing the compositions to yield materials useful as anti-reflective films and optical coupling devices.

2. Background Information

One type of curable polyorganosiloxane contains repeating units containing three organic groups bonded to the silicon atom, called M units ($R_3SiO_{1/2}$ units), and units of the formula $SiO_{4/2}$, referred to as Q units.

Polyorganosiloxanes of this type that are soluble in organic solvents are called MQ resins. For example, in the Silicone Handbook (Nikkan Kogyo Newspaper Co., Ltd.), edited by Kunio Ito, it is noted that this type of MQ resin is used as a hard coating material and as an ingredient of pressure-sensitive adhesive.

In the field of inorganic materials, a material called silica titania, which is made up of Q units and $TiO_{4/2}$ units, is known as a heat-resistant glass. With regard to this silica titania, almost nothing has been reported regarding materials in which organic groups are attached to the silicon moiety.

The present inventors have previously succeeded in manufacturing a polytitanosiloxane comprised primarily of M units, Q units and $TiO_{4/2}$ units, and have filed a patent application (Japanese Patent Application No. Hei 6[1994]-28346) based on a method for manufacturing these materials. A disadvantage of this polytitanosiloxane is that when it is left uncured following application or molding, it exhibits low strength and poor resistance to solvents and heat-induced degradation.

One objective of the present invention, in view of the aforementioned disadvantages of uncured polytitanosiloxanes, is to provide curable polytitanosiloxane compositions and a method for curing these compositions following application or molding.

SUMMARY OF THE INVENTION

As a result of accumulated studies directed at solving the problems associated with prior art titanosiloxane compositions the present inventors have developed curable compositions together with a method for curing these compositions to yield useful materials, including non-reflective films and optical coupling agents.

DETAILED DESCRIPTION OF THE INVENTION

This invention provides a curable polytitanosiloxane composition comprising

A. a polytitanosiloxane comprising a first repeating unit represented by the formula $R^1_a R^2_{(3-a)} SiO_{1/2}$, a second repeating unit represented by the formula $SiO_{4/2}$, and a third repeating unit represented by the formula $TiO_{4/2}$, wherein the total number of said first, second and third units constitutes at least 80 mol percent of the repeating units present in said polytitanosiloxane, B. an amount sufficient to crosslink said polytitanosiloxane of a curing agent selected from the group consisting of 1) organohydrogensiloxanes containing an average of more than two silicon-bonded hydrogen atoms per molecule in combination with an amount of a platinum-containing catalyst sufficient to promote crosslinking of said polytitanosiloxane; and 2) an amount sufficient to promote crosslinking of said composition of an organic peroxide;

wherein $R^1$ represents an alkenyl radical, $R^2$ represents a monovalent organic group, a is an integer from 0 to 3, and an average of at least two alkenyl radicals are present in each molecule of the polytitanosiloxane.

This invention also provides a method for curing a polytitanosiloxane containing at least two alkenyl radicals per molecule by reacting it with either 1) an organohydrogensiloxane containing at least two silicon-bonded hydrogen atoms per molecule in the presence of a platinum-containing catalyst or 2) an organic peroxide.

The Polytitanosiloxane

The polytitanosiloxane ingredient of the present compositions comprises repeating units represented by the general formulae $R^1_a R^2_{(3-a)} SiO_{1/2}$, $SiO_{4/2}$, and $TiO_{4/2}$. The combination of these three types of units constitutes at least 80 mol percent of the repeating units present in this ingredient. In these formulas $R^1$ is a alkenyl radical that preferably contains from 2 to 10 carbon atoms, and $R^2$ is a monovalent unsubstituted or substituted hydrocarbon radical that is free of ethylenic unsaturation and preferably contains from 1 to 10 carbon atoms.

The units represented by the formula $R^1_a R^2_{(3-a)} SiO_{1/2}$ are the reactive crosslinkable sites of the polytitanosiloxane and they also have good solubility in organic solvents. From the standpoint of application and moldability, it is desirable that said polytitanosiloxane be soluble in organic solvents.

Examples of $R^1$ include but are not limited to vinyl, allyl, propenyl group, butenyl, pentenyl and hexenyl. Based on ease of procurement of the starting materials, $R^1$ is preferably vinyl, allyl or hexenyl. Examples of the monovalent hydrocarbon radical represented by $R^2$ include but are not limited to alkyl such as methyl group, ethyl, propyl or butyl; aryl such as phenyl, tolyl, xylyl group or mesityl; and haloalkyl such as chloromethyl group and 3,3,3-trifluoropropyl. From an economic standpoint, $R^2$ is preferably methyl or phenyl.

a is an integer from 0 to 3, but from an economic standpoint, is preferably 1 or 0. If 2 or more alkenyl groups are not present in each molecule of polytitanosiloxane, good crosslinking cannot be obtained.

The combination of units represented by the formulae $R^1_a R^2_{(3-a)} SiO_{1/2}$, $SiO_{4/2}$, and $TiO_{4/2}$, constitute at least 80 percent of the repeating units present in this ingredient. Proper curing cannot be obtained when less than this amount is present. It is preferable that combination of these three units constitute at 90 mol percent of this ingredient, most preferably at least 95 mol percent.

There are no special restrictions on units other than the required three that can be present in the polytitanosiloxane, and examples of these additional units include but are not limited to those of the formulae $R^3_2SiO$, $R^3SiO_{3/2}$, wherein $R^3$ is a monovalent hydrocarbon radical selected from the same group as $R^2$, and alkoxy groups.

There are no special restrictions on the proportion in which the units expressed by the formula $R^1_a R^2_{(3-a)} SiO_{1/2}$, units expressed by $SiO_{4/2}$ and units expressed by $TiO_{4/2}$ are present in the polytitanosiloxane composition. The proportion for a given composition will be determined by the required properties of the cured material.

For example, when a high index of refraction is required, it is recommended that the percentage of the unit expressed by the formula $TiO_{4/2}$ included be increased, and when a low molecular weight is required, it is recommended that the relative concentration of the $R^1_a R^2_{(3-a)} SiO_{1/2}$ units be increased.

In addition, when the combined concentration of $SiO_{4/2}$ and $TiO_{4/2}$ units becomes too large, the polytitanosiloxane forms a crosslinked gel; consequently, this situation should be avoided.

To obtain good physical properties, it is preferable that the ratio of the total amount of units expressed by the formula $SiO_{4/2}$ and units expressed by the formula $TiO_{4/2}$ to the units expressed by the formula $R^1_a R^2_{(3-a)} SiO_{1/2}$ be between 0.2 and 3.0, and even more preferably between 0.5 and 2.0.

In addition, while the molar ratio of $SiO_{4/2}$ units to $TiO_{4/2}$ units is not restricted; a range from 100:1 to 1:100 is preferred.

The present compositions are converted to crosslinked materials by allowing a reaction between the polytitanosiloxane and the curing agent. The curing agent is either 1) an organohydrogensiloxane containing at least two silicon-bonded hydrogen atoms per molecule and a platinum-containing hydrosilation catalyst, or 2) an organic peroxide.

There are no particular restrictions relating to the organohydrogensiloxane used as a curing agent. Examples of this ingredient include but are not limited to low-molecular oligomers, linear high molecular weight polymers, branched high molecular weight polymers, and three-dimensional high molecular weight polymers. From the standpoint of compatibility with the polytitanosiloxane, the primary ingredient of the present compositions, it is preferable that the organohydrogensiloxane be a low-molecular polyorganosiloxane or an MQ resin containing silicon-bonded hydrogen atoms.

From the standpoint of achieving adequate crosslinking, it is preferable that the average number of silicon-bonded hydrogen atoms per molecule of the organohydrogensiloxane is at least 3 when the polytitanosiloxane contains only two alkenyl radicals per molecule.

Examples of preferred organohydrogensiloxanes include but are not limited to tetrakis(dimethylsiloxy) silane, methyltris(dimethylsiloxy) silane, phenyltris(dimethylsiloxy) silane, poly(hydrogen siloxane), dimethylsiloxane-methyl hydrogen siloxane copolymer, a copolymer of the units $H(CH_3)_2SiO_{1/2}$ and $—SiO_{4/2}$, and a copolymer containing the units $H(CH_3)_2SiO_{1/2}$, $—(CH_3)_3SiO_{1/2}$ and $—SiO_{4/2}$.

The relative concentration of organohydrogensiloxane in the present compositions is not critical, however, it is appropriate that the concentration is equivalent to a molar ratio of alkenyl radicals in the polytitanosiloxane to silicon bonded hydrogen atoms in the organohydrogensiloxane of from 5:1 to 1:5.

While there are no special restrictions regarding the platinum catalyst necessary for promoting a reaction between the polytitanosiloxane and the organohydrogensiloxane, it is advisable if the catalyst is one of those usually used for hydrosilation reactions.

Platinum chloride, chloroplatinic acid, a complex of platinum and phosphine, a complex of platinum and a vinyl-containing siloxane, or solutions of any of these are examples of preferred catalysts. While there are no particular restrictions regarding the amount of platinum catalyst to be added, it is appropriate if the amount is such that the molar ratio of the platinum metal with respect to the alkenyl radicals present in the polytitanosiloxane is from 1:100,000 to 1:100.

There are no particular restrictions on the curing conditions when using a platinum catalyst and an organohydrogensiloxane; however, it is preferable to conduct the curing reaction at room temperature or in a heated atmosphere. At temperatures lower than room temperature, curing takes too much time, and there is a tendency for the physical properties of the cured item to become insufficient. It is undesirable to have the curing temperature too high, as the platinum catalyst and the polytitanosiloxane decompose. The curing temperature is preferably between room temperature (20° C.) and 250° C.

If the composition is to be stored at room temperature for an extended period, it is preferable to include a curing retardant such as acetylene alcohol or an amine compound in the curable composition.

The second method for curing the present compositions utilizes the reaction between the polytitanosiloxane and an organic peroxide. While there are no particular restrictions on the type of organic peroxide; it is preferred that the peroxide used have a decomposition temperature of at least. The organic peroxides used as crosslinking agents for silicone rubber are preferred for use in the present compositions, and include but are not limited to alkyl peroxides, aryl peroxides, acyl peroxides, and hydroperoxides.

When an organic peroxide is used, it goes without saying that a temperature which is higher than the decomposition temperature of this organic peroxide and lower than the decomposition temperature of the polytitanosiloxane is required for crosslinking to occur.

Curing of the present compositions can be achieved using various types of conventional molding methods. Examples of useful molding methods include but are not limited to compression molding, injection molding, transfer molding, blow molding, coating and laminating.

EXAMPLES

The following examples describe preferred compositions of the present invention, and should not be interpreted as limiting the scope of the present invention as defined in the accompanying claims. Unless otherwise specified, all parts and percentages are by weight and viscosities are measured at 25° C. In the formulae that appear in the examples Me represents a methyl radical, and Vi represents the vinyl radical.

Example 1

A curable composition of this invention was prepared by blending the following ingredients to homogeneity.

100 parts of a toluene-soluble polytitanosiloxane with an average molecular weight of 25,000 expressed by the composition formula $(ViMe_2SiO_{1/2})_{0.33}(SiO_{4/2})_{0.22}(TiO_{4/2})_{0.45}$, 60 parts tetrakis(dimethylsiloxy) silane, 0.001 part platinum metal in an isopropanol solution of chloroplatinic acid and 0.01 part 3-methyl-1-buten-3-ol. The resultant mixture was applied to a glass plate. The coated plate was heated in a 150° C. oven for 3 hours.

The substrate containing the cured coating was immersed in toluene for 5 h, but the coating on the surface of the glass plate did not dissolve.

Example 2

A curable composition of this invention was prepared by blending the following ingredients to homogeneity:

100 parts of a tetrahydrofuran-soluble polytitanosiloxane with an average molecular weight of 45,000 expressed by the composition formula $(ViMe_2SiO_{1/2})_{0.28} (Me_3SiO_{1/2})_{0.22}(SiO_{4/2})_{0.2}(TiO_{4/2})_{0.3}$, 70 parts of an organopolysiloxane with an average molecular weight of 1,200 and represented by the formula $(HMe_2SiO_{1/2})_{0.61}(SiO_{4/2})_{0.39}$;

0.0005 part platinum metal in the form of tris(divinyltetramethyldisiloxaneplatinum(0) and 0.005 part methyltris(1,1-dimethyl-2-propynoxy) silane.

Using a conventional injection molding device, the resultant composition was injected into a metal mold that had been preheated to 120° C. and allowed to remain in the mold for 30 minutes. At this time the cured item was removed from the metal mold and immersed in tetrahydrofuran for 5 hours. The cured item was undissolved at the end of this time period.

Example 3

100 parts of a polytitanosiloxane that was a liquid at room temperature, exhibited an average molecular weight of 20,000 and was represented by the formula $(ViMe_2SiO_{1/2})_{0.28}(Me_3SiO_{1/2})_{0.26}(SiO_{4/2})_{0.22}(TiO_{4/2})_{0.21}(C_4H_9O_{1/2})_{0.03}$, and 2 parts 1,1-bis(t-butylperoxy)-3,3,5-trimethylcyclohexane were mixed well and poured into a beaker. After this beaker had been left in a 170° C. oven for 15 min, the liquid mixture was converted to a solid.

Cured polytitanosiloxanes prepared using the present compositions are extremely useful as anti-reflective films and as optical coupling agents for use with optical fibers and in optico-electronic devices. The cured materials are insoluble in organic solvents, and exhibit high strength and excellent heat resistance.

That which is claimed is:

1. A curable polytitanosiloxane composition comprising
A. a polytitanosiloxane comprising a first unit represented by the formula $R^1_a R^2_{(3-a)}SiO_{1/2}$, a second unit represented by the formula $SiO_{4/2}$, and a third unit represented by the formula $TiO_{4/2}$, wherein the total number of said first, second and third units constitutes at least 80 mol percent of the repeating units present in said polytitanosiloxane, B. an amount sufficient to crosslink said polytitanosiloxane of a curing agent selected from the group consisting of 1) organohydrogensiloxanes containing an average of more than two silicon-bonded hydrogen atoms per molecule in combination with an amount of a platinum-containing catalyst sufficient to promote crosslinking of said polytitanosiloxane; and 2) an amount sufficient to promote crosslinking of said composition of an organic peroxide;

wherein $R^1$ represents an alkenyl radical, $R^2$ represents a monovalent organic group, $a$ is an integer from 0 to 3, and an average of at least two alkenyl radicals are present in each molecule of the polytitanosiloxane.

2. A composition according to claim 1 wherein $R^1$ is a vinyl and $R^2$ is a group selected from either a methyl group or a phenyl group.

3. A cured polytitanosiloxane prepared by reacting a composition of claim 1.

4. A cured polytitanosiloxane of claim 3 in the form of a non-reflective film.

5. A cured polytitanosiloxane of claim 3 in the form of an optical coupling agent.

6. A method for curing a polytitanosiloxane comprising a first unit represented by the formula $R^1_a R^2_{(3-a)}SiO_{1/2}$, a second unit represented by the formula $SiO_{4/2}$, and a third unit represented by the formula $TiO_{4/2}$, wherein the total number of said first, second and third units constitutes at least 80 mol percent of the repeating units present in said polytitanosiloxane, said method comprising the steps of blending said polytitanosiloxane with an amount sufficient to crosslink said polytitanosiloxane of a curing agent selected from the group consisting of 1) organohydrogensiloxanes containing an average of more than two silicon-bonded hydrogen atoms per molecule in combination with an amount of a platinum-containing catalyst sufficient to promote crosslinking of said polytitanosiloxane; and 2) an amount sufficient to promote crosslinking of said composition of an organic peroxide; and exposing the resultant composition to a temperature sufficient to cause crosslinking of said polytitanosiloxane;

wherein $R^1$ represents an alkenyl radical, $R^2$ represents a monovalent organic group, $a$ is an integer from 0 to 3, and an average of at least two alkenyl radicals are present in each molecule of the polytitanosiloxane.

* * * * *